United States Patent
Kaufmann

[11] 3,802,190
[45] Apr. 9, 1974

[54] DEVICE FOR PRODUCING CONTROL MOMENTS IN A ROCKET-PROPELLED MISSILE

[75] Inventor: Michael Kaufmann, Neubiberg, Germany

[73] Assignee: Messerschmitt-Balkow-Blohn-Gesellschaft mit beschrankter Haftung, Munich, Germany

[22] Filed: Oct. 20, 1971

[21] Appl. No.: 190,982

[30] Foreign Application Priority Data
Nov. 10, 1970 Germany............................ 2055088

[52] U.S. Cl................. 60/225, 60/229, 239/265.15, 239/265.23, 239/265.27, 244/3.22
[51] Int. Cl.......................... F02k 9/02, F02k 1/20
[58] Field of Search............ 60/229, 230, 231, 228, 60/224, 225; 239/265.15, 265.23, 265.27; 244/1 SA, 52, 3.22

[56] References Cited
UNITED STATES PATENTS

| | | | |
|---|---|---|---|
| 2,968,454 | 1/1961 | Merrill | 244/3.22 |
| 2,974,594 | 3/1961 | Boehm | 60/229 |
| 3,099,960 | 8/1963 | Bryan | 60/229 |
| 3,135,291 | 6/1964 | Kepler | 60/231 |
| 3,168,807 | 2/1965 | Ledwith | 60/228 |
| 3,231,223 | 1/1966 | Upper | 244/1 SA |
| 3,330,483 | 7/1967 | Lewis | 239/265.23 |
| 3,524,319 | 8/1970 | Stockel | 60/261 |

*Primary Examiner*—Douglas Hart
*Attorney, Agent, or Firm*—McGlew and Tuttle

[57] ABSTRACT

A rocket propelled missile includes a housing for a rocket engine having a plurality of control nozzle assemblies arranged around the periphery thereof. Each assembly is continuously supplied with thrust gases, for example, from the main rocket engine and each includes a thrust discharge in the direction of the main thrust discharge and an additional thrust discharge extending outwardly in a tangential clockwise or counterclockwise direction, or both. Control means are provided for controlling the various thrust nozzle discharges.

3 Claims, 5 Drawing Figures

DEVICE FOR PRODUCING CONTROL MOMENTS IN A ROCKET-PROPELLED MISSILE

BACKGROUND OF THE INVENTION

1. Field of the Invention

This invention relates in general to rocket propelled missiles and in particular to a new and useful device for producing control moments about the rocket propelled missiles about at least one of three principal axes of the rocket propelled missile.

Description of the Prior Art

In a known missile propelled by means of a liquid rocket engine (as shown in U.S. Pat. No. 3,260,244) a pivotable engine suspension in connection with servomotors engaging on the engine body makes possible control movements about the axes of pitch and yaw. To produce control moments about the axis of roll, there is disposed on the outside of the missile a pivotable control nozzle, whose longitudinal axis intersects the axis of roll at an acute angle in the zero position, namely in the center of gravity of the missile. The control nozzle, is pivoted out of the zero position by a complicated, hydraulically operated lever mechanism. The entire exhaust gas of a turbine is supplied to the control nozzle and it is fed from a gas generator which first drives the turbine to operate a delivery pump for rocket fuel.

Another rocket-propelled missile of known construction uses a pivotable suspension of the main engine for effecting control movements about the axes of pitch and yaw but this system has been dispensed with, and this because a. of the high cost of construction, b. of the considerable additional weight resulting therefrom and from the need for powerful servomotors, and c. of the great danger of the freezing of movable parts existing under the extreme operating conditions.

For the production of control moments about the axes of pitch and yaw and also for the production of control moments about the axis of roll, control nozzles of a control engine system with fuel supply separate from the main engine are used. These control nozzles, singly distributed over the missile circumference, are oriented radially or respectively tangentially according to their purpose from the start. In this they differ positively from the control nozzle of the first-named missile which, when needed, must first be pivoted out of its zero position by means of the complicated lever mechanism susceptible to freezing. Another difference between the control nozzles of the missile in question and that of the above-described missile consists in that the former, unlike the latter, are admitted with control medium only when needed. Such an intermittent admission of the individual control nozzles, however, requires expensive on-off valves and moreover leads to undesirable impact stresses in the control engine system, whose weight is considerable on account of the fuel supply being separate from the main engine.

A problem underlying the invention is to develop a device of the above-mentioned kind, which is of simple construction, low weight, and great reliability.

This problem is solved according to the invention by control nozzle groups or assemblies distributed over the missile circumference and continuously supplied with small quantities of compressed gas from the rocket process. Each control nozzle group is admitted by the continuously supplied compressed gas or thrust gas and until deviations from the course occur, the thrust acts in the main thrust direction. At least one other control nozzle with thrust direction counter to the main thrust direction or tangential thereto, clockwise or counterclockwise is also supplied with the compressed gas which is continuously supplied to the control nozzle groups. This other control nozzle is adjustable or is made effective by means of continuously operating switching elements responding to deviations from the course.

The device according to the invention is distinguished by its simple construction, its comparatively low weight, and its great reliability, and therefore, by combining the advantages of the previously described known devices of the same kind without having their disadvantages, is excellently suitable for position control of rocket-propelled missiles. Its simple construction and low weight results chiefly from the fact that the control nozzle groups are supplied with compressed gas shunted from the rocket process and not with compressed gas from a fuel system of their own, separate from the main engine of the missile. The fact that this supply of compressed gas is continuous makes it possible to eliminate installation of expensive, trouble-prone on-off valves in the supply lines leading to the control nozzle groups. It is to this and to the absence of pivotable control nozzles, which are known to tend to freeze, that the great reliability of the device according to the invention is mainly attributable. If the course of a rocket-propelled missile equipped with this device is correct, the compressed gas supplied continuously to each control nozzle group and shunted from the rocket process expands — in that particular control nozzle whose thrust direction coincides with the direction of the main thrust, so that the produced control thrust contributes to the propulsion. Before the entrance into the control nozzles of the last-named kind, it can, if necessary, for the position control of the missile, be deflected to another control nozzle of the same control nozzle group having an orientation corresponding to the desired position correction. Due to the continuous compressed gas supply to the individual control nozzle groups, such a deflection offers no difficulties of any kind. It can easily be effected, for example, by means of continuously operating throttle valves, flow switches or the like.

A design of the device according to the invention, which is intended for the production of control moments about the axis of roll of a rocket-propelled missile, consists essentially of two pairs of control nozzle groups. The two control nozzle groups of one pair comprise a control nozzle with thrust direction codirectional to the main thrust and a control nozzle with tangential thrust direction clockwise. The two control nozzle groups of the other pair are formed by a control nozzle with thrust direction again co-directional to the main thrust and by a control nozzle with tangential thrust direction counterclockwise. All four control nozzle groups are distributed at equal distances from each other over the missile circumference, and this in such a way that those belonging to the same pair are diametrically opposite each other.

The above described design of the device according to the invention operates as follows:

The compressed gas from the rocket process continuously supplied to the control nozzle groups of both pairs normally expands in those control nozzles whose thrust direction coincides with the main thrust direction. Only when control moments about the missile's roll axis acting clockwise or counterclockwise are required, it is deflected in one or the other pair of opposite control nozzle groups respectively to the correspondingly oriented control nozzles, by means of switching elements of the kind already mentioned.

When — as is the case according to another feature of the invention — each of four control nozzle groups evenly distributed over the missile circumference comprising one control nozzle with thrust direction co-directional to the main thrust comprises a control nozzle with tangential thrust direction clockwise as well as a control nozzle with tangential thrust direction counterclockwise, the control moments can be produced not only about the axis of roll but also about the pitch and yaw axes of the missile. For the production of control moments of the last-named kind it suffices if the switching elements of the kind already mentioned associated to the control nozzle groups provide that in one of diametrically opposite control nozzle groups the continuously supplied compressed gas stream is deflected to the control nozzle with tangential thrust direction in one rotational direction and in the other to the control nozzle with opposite rotational thrust direction.

In further development of the invention, to each control nozzle group of the above described type there is associated an additional control nozzle with thrust direction opposed to the main thrust. Although this measure is connected with a somewhat greater expenditure of switching elements for the deflection of the continuously supplied compressed gas into the now present four control thrust directions, it permits production of additional control moments about the axes of pitch and yaw of the missile if the control nozzle groups are properly distributed over the missile circumference.

In a liquid rocket engine of the so-called topping cycle or staged combustion cycle construction, a gas mixture rich in oxygen or fuel is, as is known, produced in a precombustion chamber and is expanded with performance of work in a turbine before it continues to react with fuels or respectively oxygen carriers in a main combustion chamber. The gas current which admits the pump driving turbine also flows to the combustion chamber for supplying the main thrust in series. If the device according to the invention is associated with a missile equipped with such a rocket engine, it is advisable to shunt the small quantities of compressed gas to be supplied continuously to the control nozzle groups from the turbine exhaust gas. In this case, in fact, the expansion of the shunted quantities of compressed gas in the control nozzles furnishes approximately the same specific impulse as the main engine, for example, 400 seconds as against 450 seconds, so that at a required control thrust for example 1 percent of the main thrust the loss of specific impulse resulting from the shunting of the compressed gas is only in the order of 1/10. This low loss of specific impulse is more than cancelled out by the advantages of the device according to the invention, such as simple construction, low weight and great reliability.

Although for the above named reason the continuous discharge of compressed gas for the control nozzle groups behind the turbine of a topping cycle engine is particularly recommendable, it is not limited to this location. Instead, the quantities of compressed gas to be supplied continuously to the control nozzle groups may be discharged also from the exit-side end of the combustion chamber cooling system, from the precombustion chamber before the turbine, or from the main combustion chamber. Sometimes it is advisable also, in order to bring about an optimum operating temperature in the control nozzles, to shunt compressed gases from the rocket process simultaneously at two or more of the aforementioned discharge points and to mix the shunted compressed gases before they are fed continuously into the individual control nozzle groups.

Accordingly it is an object of the invention to provide a device for producing control moments about at least one of the three principal axes of a rocket propelled missile which includes a plurality of nozzle groups distributed around the circumference of the missile which are supplied continuously with thrust gas from the main rocket engine and which includes a thrust discharge acting in the same direction as the main thrust, and an additional discharge which may be selectively actuated to act in a tangential clockwise or counterclockwise direction.

A further object of the invention is to provide a control nozzle assembly for missiles which includes passage means for directing thrust gases through a nozzle and then selectively into either a first passage supplying the gases for discharge through a thrust nozzle in the direction of the main rocket thrust and a second passage for discharging the thrust gases through a nozzle oriented at an angle to the main rocket thrust and with control means which are adjustable for selectively directing the thrust gases to said first and second passages.

A further object of the invention is to provide a flying body with control nozzle constructions which are simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

GENERAL DESCRIPTION OF THE PREFERRED EMBODIMENTS

Figure 1:
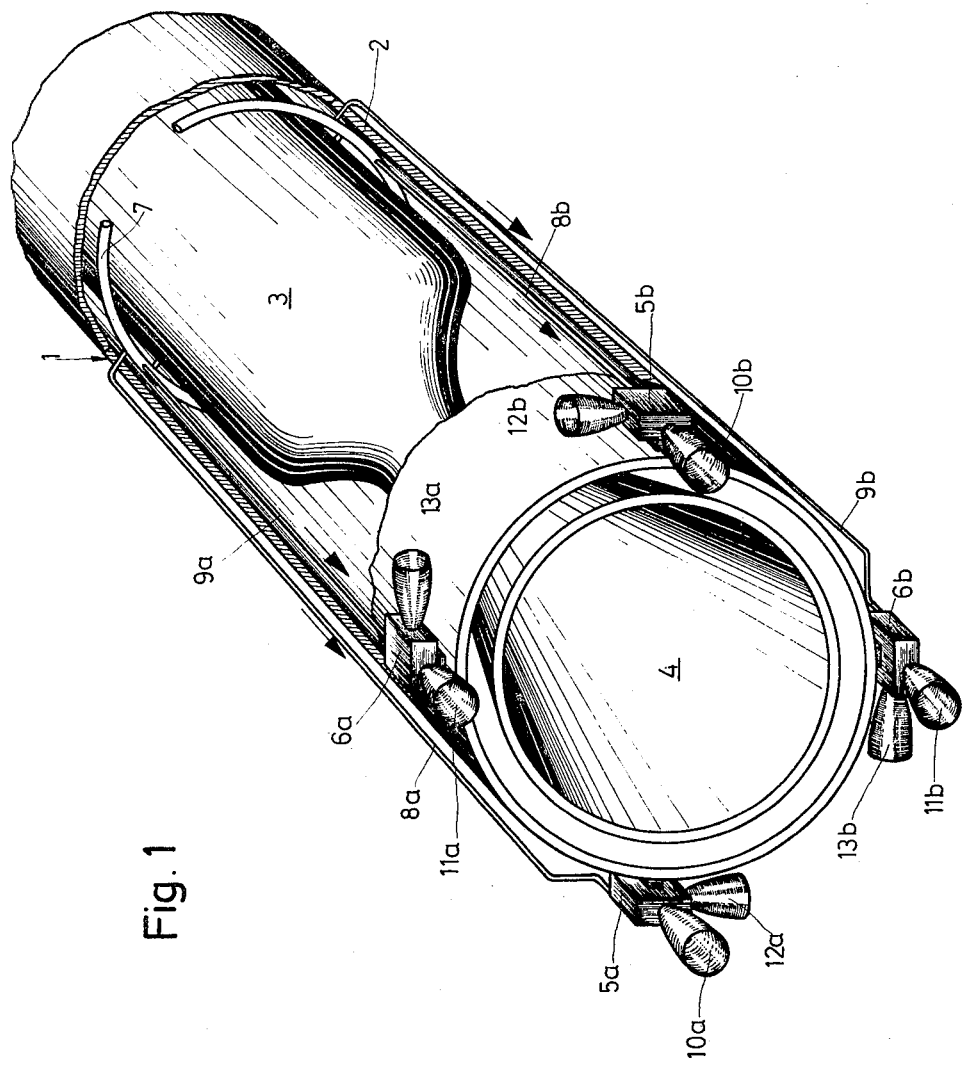
FIG. 1 is a rear perspective view partly broken away of a rocket propelled missile having a device for producing control moments constructed in accordance with the invention.
Figure 2:
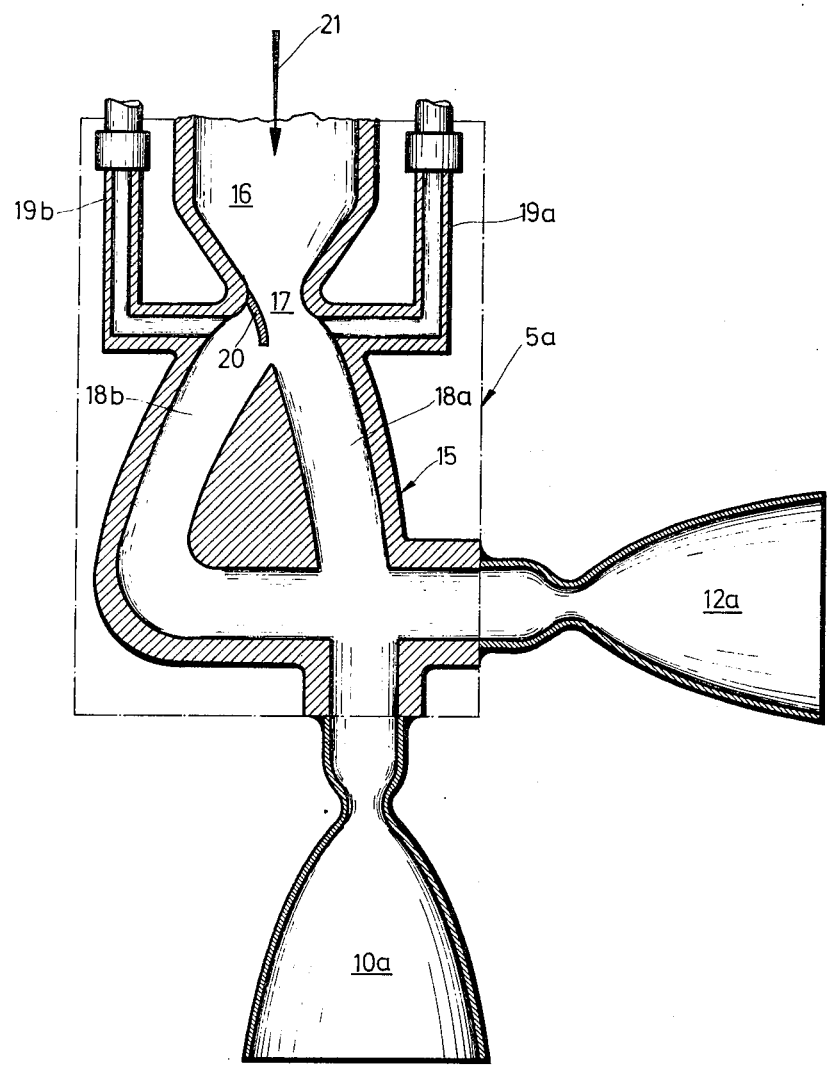
FIG. 2 is an enlarged transverse sectional view of one of the control nozzle assemblies shown in FIG. 1.

Referring to the drawings, in particular, the invention embodied therein in FIGS. 1 and 2 comprises a rocket propelled missile generally designated 1 having an outer shell or housing 2 surrounding a rocket engine which includes a main combustion chamber 3 and a thrust nozzle 4 which discharges rearwardly.

In accordance with the invention a plurality of nozzle groups or nozzle assemblies are arranged around the circumference of the housing 2, and, in the embodiment illustrated, four control nozzle groups 5a and 5b and 6a and 6b are disposed at evenly spaced locations around the circumference of the housing. All of the nozzle groups, 5a, 5b, 6a and 6b are continuously supplied with small quantities of thrust gases or compressed gases from the combustion chamber 3 of the main engine which distributes these gases through a distributor ring 7 and four tap lines 8a, 8b, 9a and 9b, which supply the respective groups. The control nozzle groups are arranged in diametrically opposite pairs 5a and 5b and 6a and 6b.

One of the pairs of control nozzle groups 5a and 5b have control nozzles 10a and 10b which direct thrust in the same direction as the main thrust. In addition, they have control nozzles 12a and 12b which direct the thrust tangentially in a clockwise direction. The two control nozzle groups 6a and 6b have two control nozzles 11a and 11b which direct the thrust in the same direction as the main thrust and additional thrust nozzles 13a and 13b which direct the thrust tangentially but in a counterclockwise rotational direction.

In both pairs of control nozzle groups the continuously supplied compressed gases or thrust gases expand and are directed outwardly in thrust directions coincident with the main thrust direction and this continues until a roll movement of the missile either clockwise or counterclockwise is required for control purposes. In such a case in one or the other of the pair of control nozzle groups, the continuously supplied compressed gases are deflected from their original direction in which they are directed outwardly rearwardly to a tangential thrust direction in accordance with which rotational movement is desired. The deflection of the gases is controlled by control means, for example, in the form of bi-stable flow switches which are associated with each nozzle assembly 5a, 5b, 6a and 6b.

Figure 4:
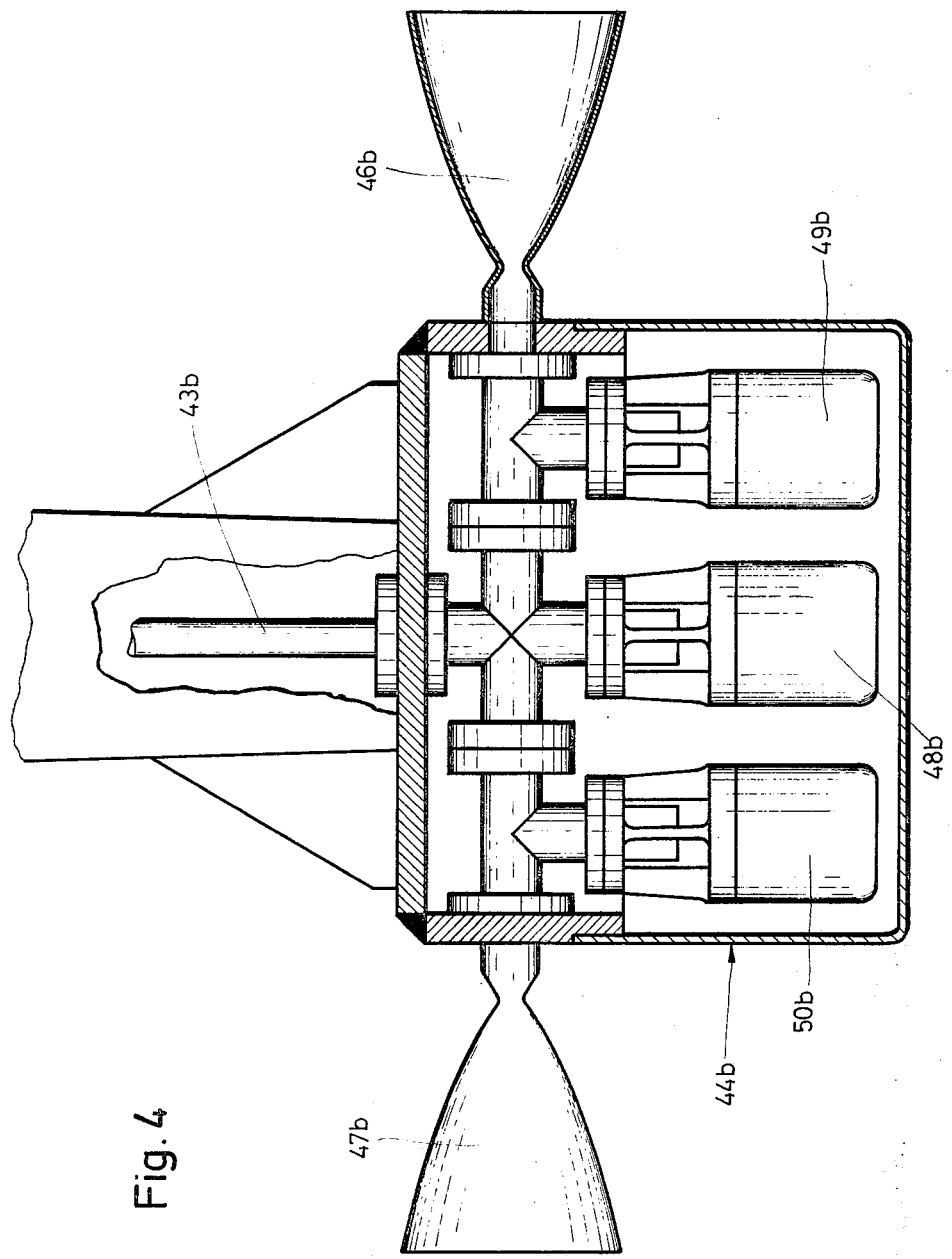
FIG. 4 is an enlarged transverse sectional view of one of the nozzles shown in FIG. 3.

As shown in FIG. 2, all of the control nozzle assemblies have a construction similar to the control nozzle assembly 5a shown in FIG. 2, or the construction 44b shown in FIG. 4. The embodiment shown in FIG. 2 includes switching or control means 15 associated with each flow passage 16 for the flow of thrust gases from the main combustion chamber. The inlet passage 16 terminates at its inner end in a convergent divergent nozzle section 17 which connects downstream to two separate passages or channels 18a and 18b. The control means for selectively operating either the thrust nozzle 10a which directs the thrust in the same direction as the main thrust or the thrust nozzle 12a which directs the thrust in a direction for rotation of the missile includes separate connecting lines 19a and 19b for auxiliary control media which enters downstream of the nozzle section 17 immediately behind a control plate or deflection plate 20. The plate 20 is made of easily fusible material and in the position indicated it blocks flow from the thrust nozzle through the passage 18b into the thrust nozzle discharge 12a. The guide plate 20 gradually dissolves during the operation so that the compressed gas which is introduced at 21 through the inlet 16 first enters the outlet channel 18a and is directed in the same direction as the main thrust nozzle 10a. As soon as the guide plate 20 is destroyed by the action of the gases said gases are deflected by gaseous media flowing through thb passages 19a or 19b into either one of the outlet channels 18a or 18b.

Figure 3:
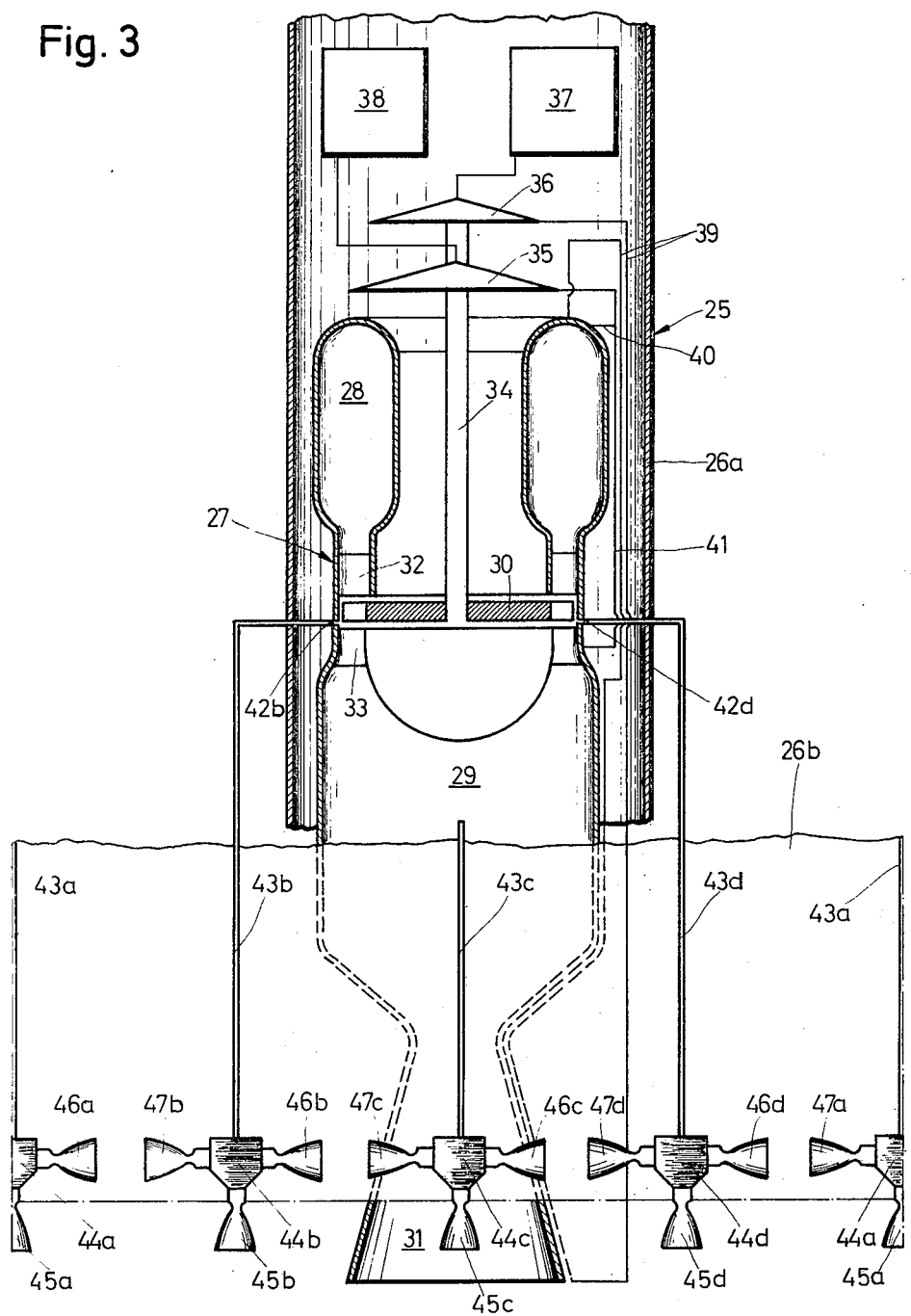
FIG. 3 is a partial transverse sectional view and partial development of another development of another embodiment of rocket propelled missiles.

In the embodiment shown in FIGS. 3 and 4, there is provided a missile generally designated 25, having an outer housing or shell 26a which surrounds a liquid rocket engine of the main stream or main flow type generally designated 27. The rocket engine 27 serves as a drive for the missile and comprises a pre-combustion chamber 28, a main combustion chamber 29, an auxiliary turbine located between the precombustion chamber 28 and the main combustion chamber 29, and a thrust nozzle 31 connected to the discharge end of the main combustion chamber 29. Proceeding in the direction of flow of gases of the precombustion chamber 28, the gases move through a lead grid 32 through the turbine 30 and a lag grid 33 and pass into the main combustion chamber 29. The auxiliary turbine 30 drives a shaft 34 which is connected to the rotors of two pumps 35 and 36 which are provided for conveying propellant components from reservoirs 37 and 38 to the system. One propellant component is first conducted for cooling purposes along the wall of the thrust nozzle 31 and then along the main combustion chamber 29 before it is fed through a line 39 into the precombustion chamber 28. In the precombustion chamber the propellant component reacts with a portion of the other propellant component admitted through the line 40 and forms the propellant gases. The remainder of the propellant component passes through a line 41 into a retardation lag grid 33 where it is admixed to the propellant gases expanded in the auxiliary turbine 30 and performs work. Before the gases enter into the retardation lag grid 33 connected after the auxiliary turbine 30 at four points evenly distributed around the engine circumference, two of which are visible 42b and 42d, small quantities of these propellant gases are continuously shunted and continuously supplied through lines 43a to 43d to four control nozzles 44a to 44d. These control nozzle groups 44a to 44d are, as shown in the development 26b, disposed externally of the missile shell at equally spaced locations from each other.

Each of the control nozzle groups or assemblies 45a to 45d are oriented to direct thrust in a direction of the main thrust. Each of the group of nozzles 46a to 46d are oriented to direct a tangential thrust in a clockwise direction and the nozzles of the group 47a to 47d direct a tangential thrust in a counterclockwise direction.

As shown in FIG. 4 the nozzles 45a to 45d are continuously admitted with thrust gases until a control movement of the missile is designed. The admission of the thrust gases to the individual nozzles is controlled by continuously operating electrically actuated throttle valve 48b, 49b and 50b in the supply lines to the control nozzles 45b, 46b and 47b, but only those controls for the tangential thrust direction 47b and 46b are visible in FIG. 4.

Figure 5:
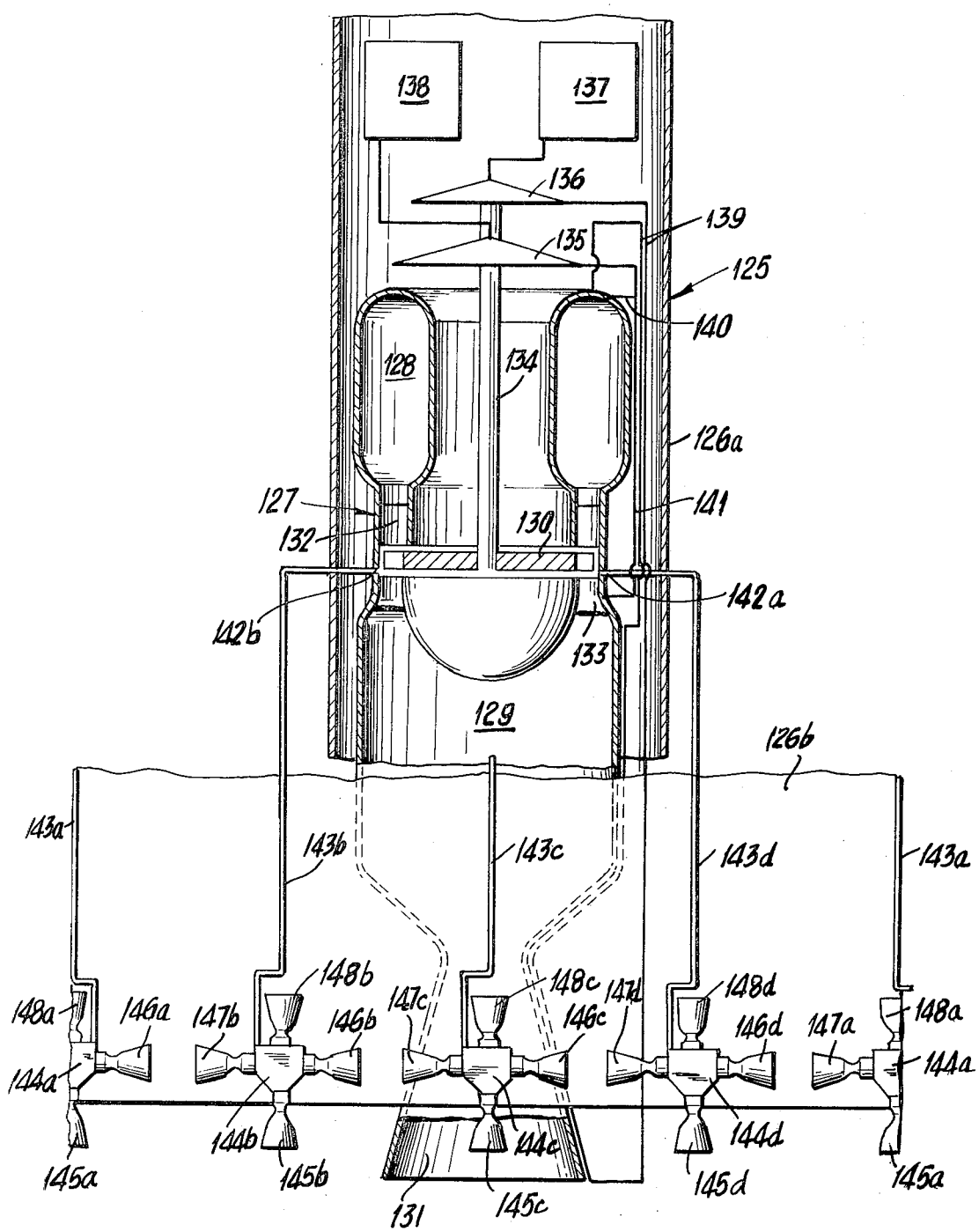
FIG. 5 is a view similar to FIG. 3 of another embodiment of the invention.

The embodiment shown in FIG. 5 is substantially identical to that shown in FIG. 3, but with the exception that each nozzle group includes a fourth set of nozzles 148a, 148b, 148c and 148d which are oriented to direct thrust in a direction opposed to the direction of the main thrust which is discharged from the main combustion chamber 129 through the thrust nozzle discharge 131. This embodiment is identical in other respects and include parts which are similarly designated but which have 100 added to the basic numerical designation. As shown each nozzle group includes a first nozzle (145a–145d) with a thrust direction codirectional with the main thrust, a second nozzle (146a–146d) with tangential thrust direction in a clockwise direction, and a third nozzle (147a–147d) with a tangential thrust in a counterclockwise direction, in addition to the fourth nozzle (148a–148d) with the thrust direction opposed to the direction of the main thrust.

In the Embodiment of FIG. 5 the alternate admission of the controlled nozzles 145a–145d, 146a–146d, 147a–147d and 148a–148d of the four control nozzles groups 144a, 144b, 144c and 144d with the continuously supplied propellent gases is regulated, for example, by continuously operating throttle valves actuated electrically and the supply nozzles connecting the individual nozzles similar to that of the embodiment of FIG. 3 or by an arrangement similar to FIG. 2 for each pair of right angularly disposed nozzles of each group.

While specific embodiments of the invention have been shown and described in detail to illustrate the application of the principles of the invention, it will be understood that the invention may be embodied otherwise without departing from such principles.

What is claimed is:

1. A device for producing control moments about at least one of the three principal axes of a rocket-propelled missile, in particular of a rocket stage with an engine of a topping cycle construction, providing a main rocket thrust rearwardly, comprising a plurality of control nozzle groups distributed over the missile circumference, means for continuously supplying thrust gas from the main rocket engine to said nozzle groups, said nozzle groups including a control nozzle being continuously supplied with thrust gases until a deviation from the course is desired, said control nozzle having a thrust discharge acting in the direction of the main rocket thrust, and at least one additional control nozzle with a thrust direction disposed at an angle to the main thrust direction, and control means connected to said supplying means for selectively directing thrust gases to said additional control nozzle, said rocket engine comprising a topping cycle construction including a precombustion chamber and a main combustion chamber, said precombustion chamber supplying oxygen-rich or fuel-rich reaction gases to said main combustion chamber, a turbine located between said precombustion chamber and said main combustion chamber driven from the gases from said precombustion chamber, said means for supplying thrust gases to said nozzle groups comprising a shunt connection from the exhaust of said turbine to said nozzle groups.

2. A missile comprising a housing, a rocket engine in said housing having a main combustion chamber with a main thrust nozzle with a rear thrust discharge, a precombustion chamber for generating one-propellant component rich combustion gases connected to said main combustion chamber, said main combustion chamber having means for completing combustion of said precombustion chamber gases and for adding a second propellant component, a turbine connected between said precombustion chamber and said main combustion chamber, a plurality of control nozzle assemblies arranged around the periphery of said housing, each of said assemblies including at least one rearwardly directed thrust nozzle having a rearwardly directed thrust discharge and having an inlet at its opposite end and at least one tangentially directed thrust nozzle having a tangentially directed thrust discharge and an inlet at its opposite end, and a gas supply conduit connected from said turbine to said control nozzles including a normally open connection to said rearwardly directed thrust nozzle inlet and a normally closed connection to said tangentially directed thrust nozzle inlet and valve means for opening the connection to the inlet of said tangentially directed thrust nozzle.

3. A missile according to claim 2, wherein said valve means comprises a valve member made of a fusible material.

* * * * *